US012547122B2

(12) United States Patent
Rochat

(10) Patent No.: US 12,547,122 B2
(45) Date of Patent: Feb. 10, 2026

(54) STOPPING MECHANISM FOR STOPPING OR RELEASING A HOROLOGICAL REGULATING OR CHRONOGRAPH MECHANISM WHEEL

(71) Applicant: Montres Breguet S.A., L'Abbaye (CH)

(72) Inventor: Jean-Philippe Rochat, Les Bioux (CH)

(73) Assignee: Montres Breguet S.A., L'Abbaye (CH)

( * ) Notice: Subject to any disclaimer, the term of this patent is extended or adjusted under 35 U.S.C. 154(b) by 448 days.

(21) Appl. No.: 18/295,573

(22) Filed: Apr. 4, 2023

(65) Prior Publication Data

US 2023/0408982 A1 Dec. 21, 2023

(30) Foreign Application Priority Data

Jun. 20, 2022 (EP) .................................... 22179968

(51) Int. Cl.
*G04F 7/08* (2006.01)
*G04B 17/20* (2006.01)

(52) U.S. Cl.
CPC ........... *G04F 7/0861* (2013.01); *G04B 17/20* (2013.01)

(58) Field of Classification Search
CPC .............................. G04B 17/20; G04F 7/0861
See application file for complete search history.

(56) References Cited

U.S. PATENT DOCUMENTS 3,733,805 A 5/1973 Kashimura et al.
7,244,062 B2 * 7/2007 Golay .................. G04B 27/004 368/142
11,586,148 B2 * 2/2023 Jeanrenaud .......... G04B 17/285
2004/0062149 A1 4/2004 Geyer
2011/0164474 A1 * 7/2011 Jolidon ................ G04B 37/066 368/66

FOREIGN PATENT DOCUMENTS

CH 716 423 A2 1/2021
EP 1 451 647 A0 9/2004
EP 2 221 678 A1 8/2010
JP 47-036077 U 12/1972
JP 2005-512065 A 4/2005

OTHER PUBLICATIONS

European Search Report for 22 17 9968 dated, Sep. 30, 2022.

* cited by examiner

*Primary Examiner* — Edwin A. Leon
*Assistant Examiner* — Jason M Collins
(74) *Attorney, Agent, or Firm* — Sughrue Mion, PLLC

(57) ABSTRACT

A mechanism for stopping (100) or releasing a regulating or chronograph mechanism wheel (1) in rotation about a main axis (D), including a control organ (210) operable by a user and linked with a stopping lever (2) including a support surface (20) arranged to cooperate with a complementary support surface (11) of the wheel (1), and movable between a working position where any support surface (20) is distant from the complementary support surface (11), and a stopping position where a support surface (20) is bearing thereon. Also, a timepiece (1000) including regulating or chronograph mechanism including such a stopping mechanism (100).

17 Claims, 5 Drawing Sheets

STOPPING MECHANISM FOR STOPPING OR RELEASING A HOROLOGICAL REGULATING OR CHRONOGRAPH MECHANISM WHEEL

CROSS REFERENCE TO RELATED APPLICATIONS

The present application is based on, and claims priority from the prior European Patent Application No. 22179968.7, filed on Jun. 20, 2022, the entire contents of which are incorporated herein by reference.

TECHNICAL FIELD OF THE INVENTION

The invention relates to a mechanism for stopping or releasing a regulating or chronograph mechanism wheel in rotation about a main axis, including a control organ that can be operated by a user and linked with a stopping lever including a support surface arranged to cooperate with a complementary support surface of the wheel, and movable between a working position where any support surface is distant from the complementary support surface, and a stopping position where a support surface is bearing thereon. The invention further relates to a timepiece including a regulating or chronograph mechanism including a structure and at least a first bridge on either side of a wheel rotating about a main axis, and including such a stopping mechanism, for triggering the stopping or release of said regulating or chronograph mechanism wheel.

The invention relates to the field of horological stopping mechanisms.

Technological Background

Stopping levers, also known as stop levers, are designed to stop the rotation of a wheel, and to release it on the user's instruction. These levers are generally inserted next to the wheels in question, in highly occupied zones where little space is available. For this reason, these levers are often inserted in a non-dismantlable manner in stacks of bridges or similar, which requires a complete dismantling of the stacking of these bridges, for an intervention on the mechanisms disposed behind the stop levers, or on the stop levers themselves.

In particular, a recurrent problem is that the stop lever prevents the dismantling of the pallet assembly bridge, for example in the event of the need to set the mount of the pallet assembly pallets.

To remove the stop-second, it would be necessary in principle to remove the bridges which are on top of the stop-second bridge, to obtain a configuration without the bridges, which makes it possible to dismantle the stop-second.

This is disadvantageous as it is very time-consuming, and gives rise to a risk of damage and/or soiling of components.

SUMMARY OF THE INVENTION

The invention proposes to provide an economical solution for this problem, by allowing a removal at minimal cost of the stop lever, to enable any other intervention on the timepiece.

To this end, the invention relates to a mechanism for stopping or releasing a regulating or chronograph mechanism wheel, according to claim 1.

The invention further relates to a timepiece including a regulating or chronograph mechanism including such a stopping mechanism, for triggering the stopping or release of this regulating or chronograph mechanism wheel.

BRIEF DESCRIPTION OF THE FIGURES

The invention will be understood more clearly in light of the following description, and the appended drawings, where.

DETAILED DESCRIPTION OF THE INVENTION

Figure 1:
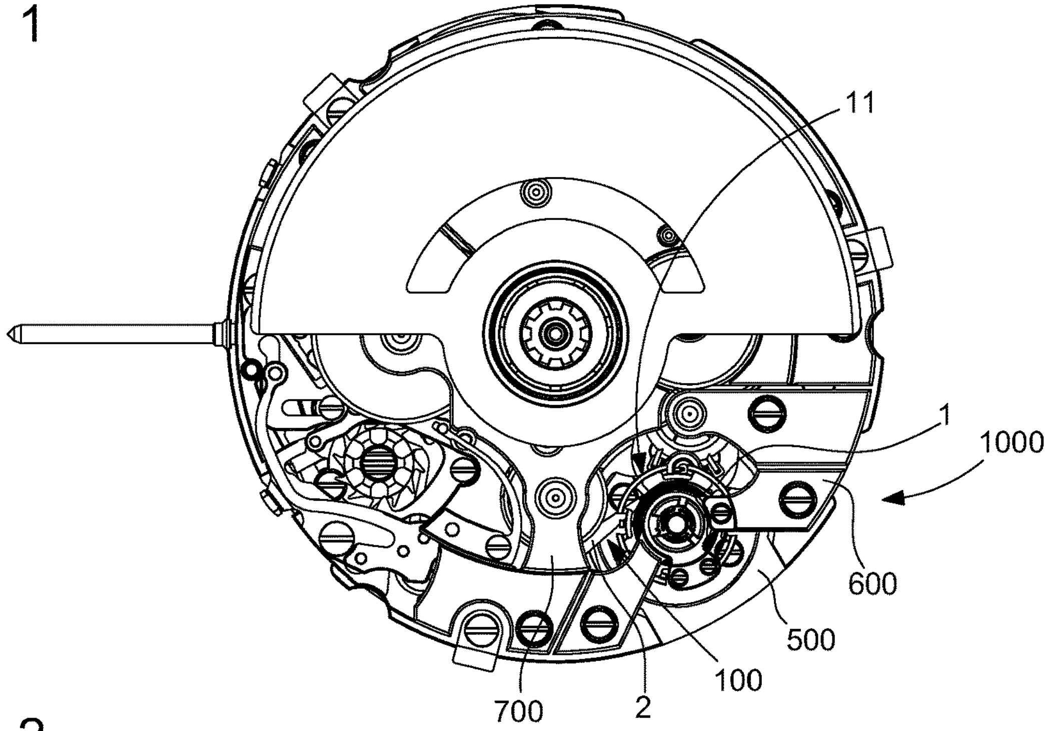
FIG. 1 represents, schematically, in a partial plane view, a timepiece including a spring balance regulating mechanism, with a stopping mechanism including a stop lever inserted between the balance and the plate, which bears a first balance bridge and a second stop-second bridge.
Figure 2:
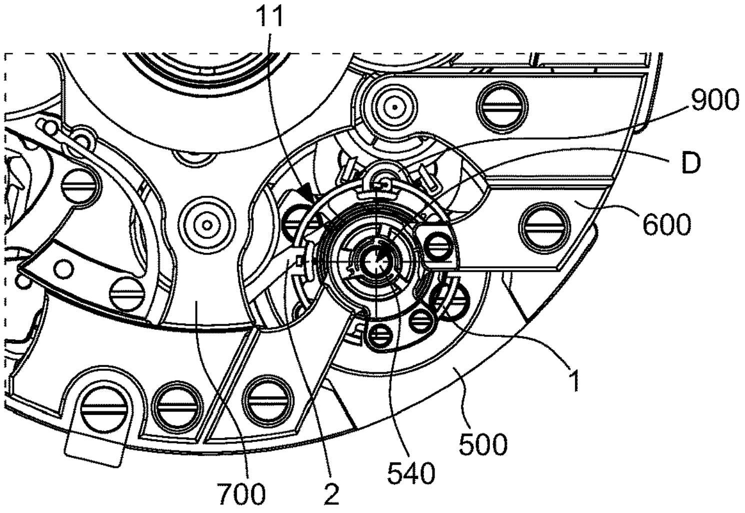
FIG. 2 is a detail of FIG. 1.
Figure 3:
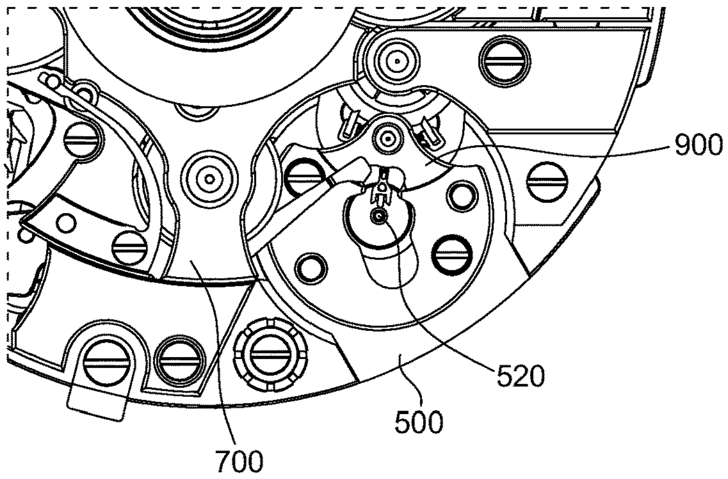
FIG. 3 represents the same mechanism after removing the balance bridge and the balance, it is seen that the stop lever obstructs the access to the pallet assembly bridge.
Figure 4:
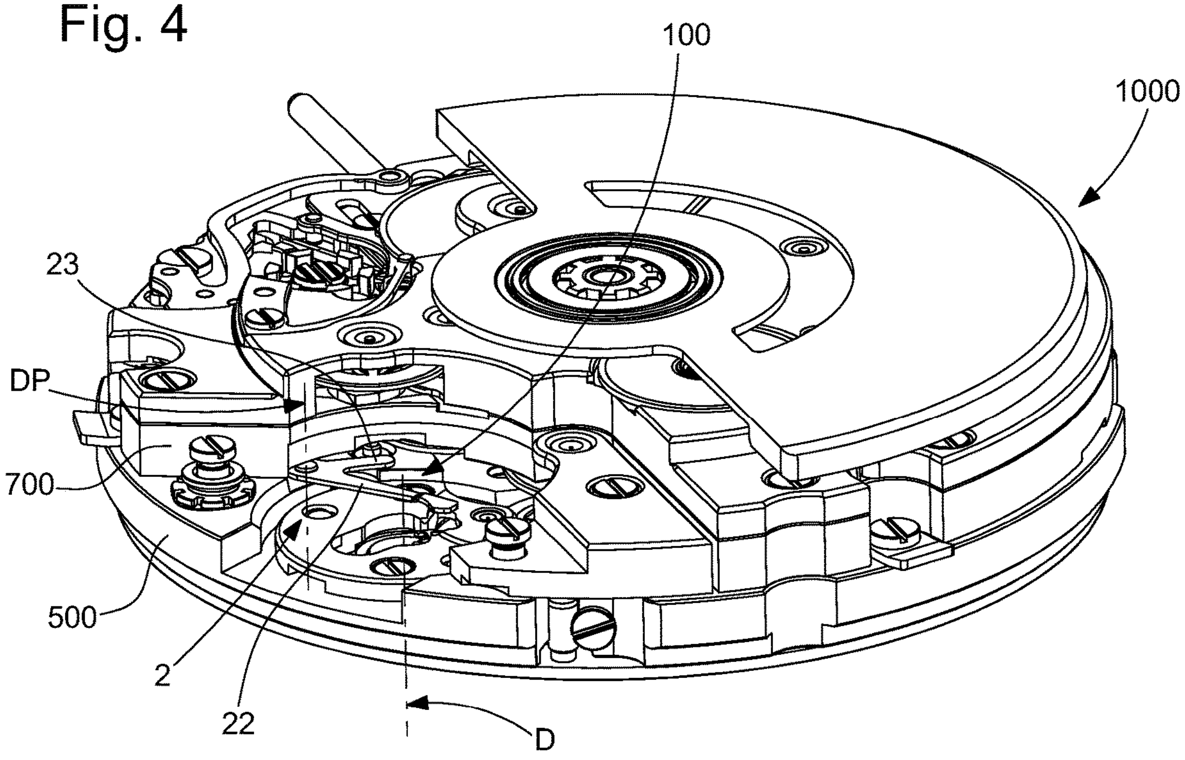
FIG. 4 represents, schematically, in a perspective view, the same mechanism in the state in FIG. 3.
Figure 5:
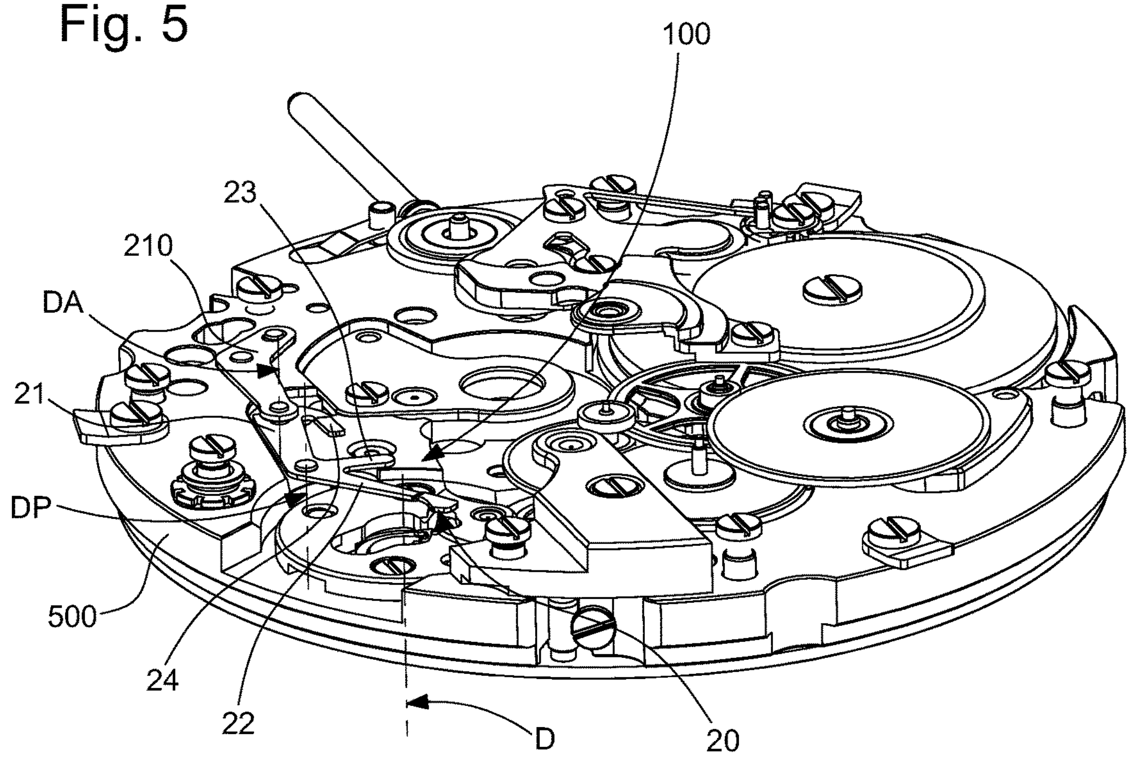
FIG. 5 represents, similarly to FIG. 3, the same mechanism after removing all the bridges, particularly the stop-second bridge.
Figure 6:
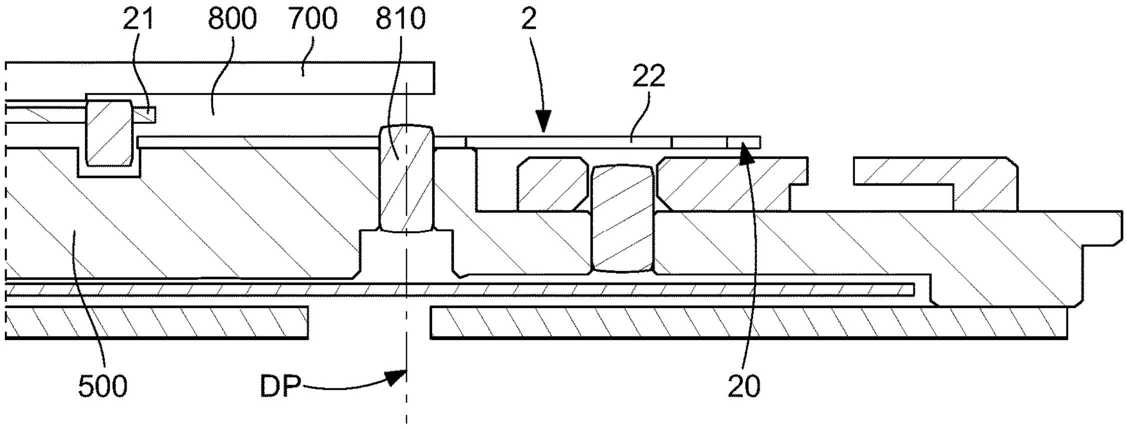
FIG. 6 represents, schematically, in a partial perspective view, a mechanism including a stopping mechanism according to the invention, in a similar state to that of FIG. 3, i.e. after removing the balance bridge and the balance; the pivoting guidance of the stopping lever is seen in a chamber arranged between the support plate and the second stop-second bridge, about a trunnion limited in height so as to allow the axial and then planar extraction of the stopping lever.
Figure 7:
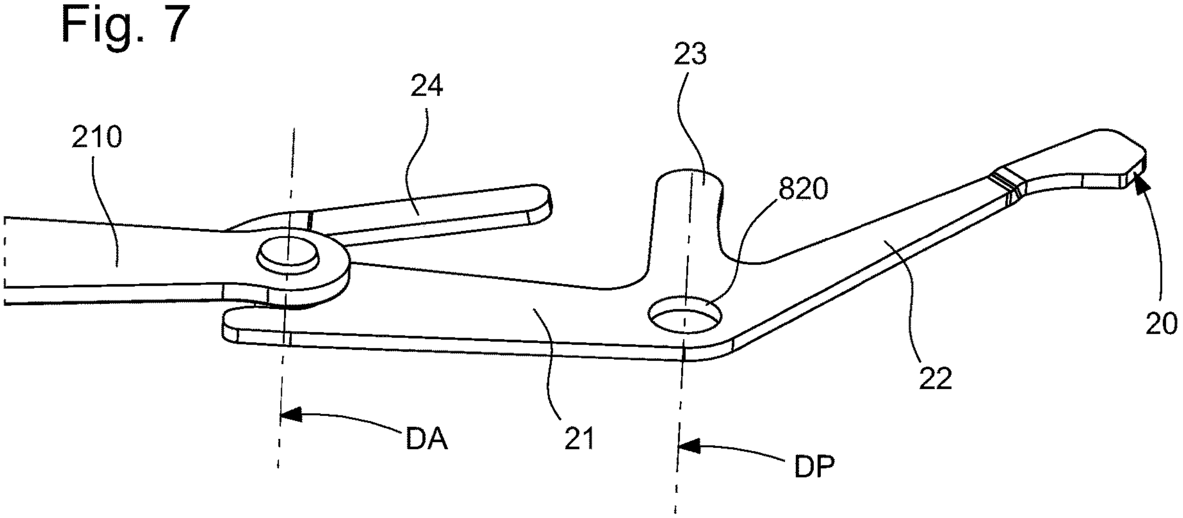
FIG. 7 represents, schematically, in a partial perspective view, the stopping lever according to the invention, and the removable link thereof with a control organ that can be operated directly or indirectly by a user, seen in the left part of the figure.
Figure 8:
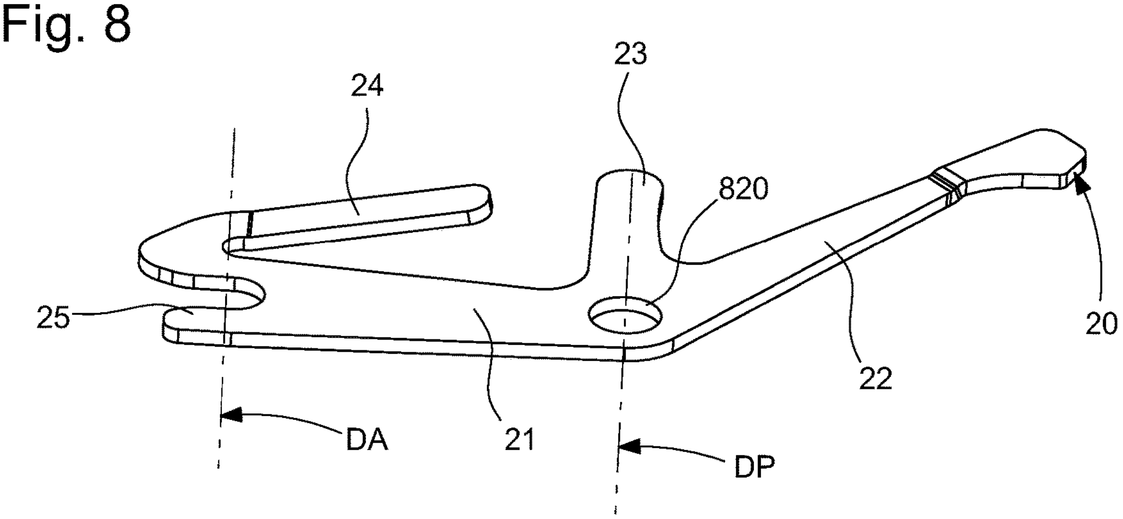
FIG. 8 represents, schematically, in a perspective view, the stopping lever alone, with, disposed in a fan about the pivot axis, a first control arm, a second support arm, a third stabilisation arm; at the distal end of the first control arm, the fork enabling the removable link with the control organ, and, at the rear, a fourth flexible arm, not coplanar with the other arms, and making it possible to press the stopping lever on the support plate in normal working are made out.
Figure 9:
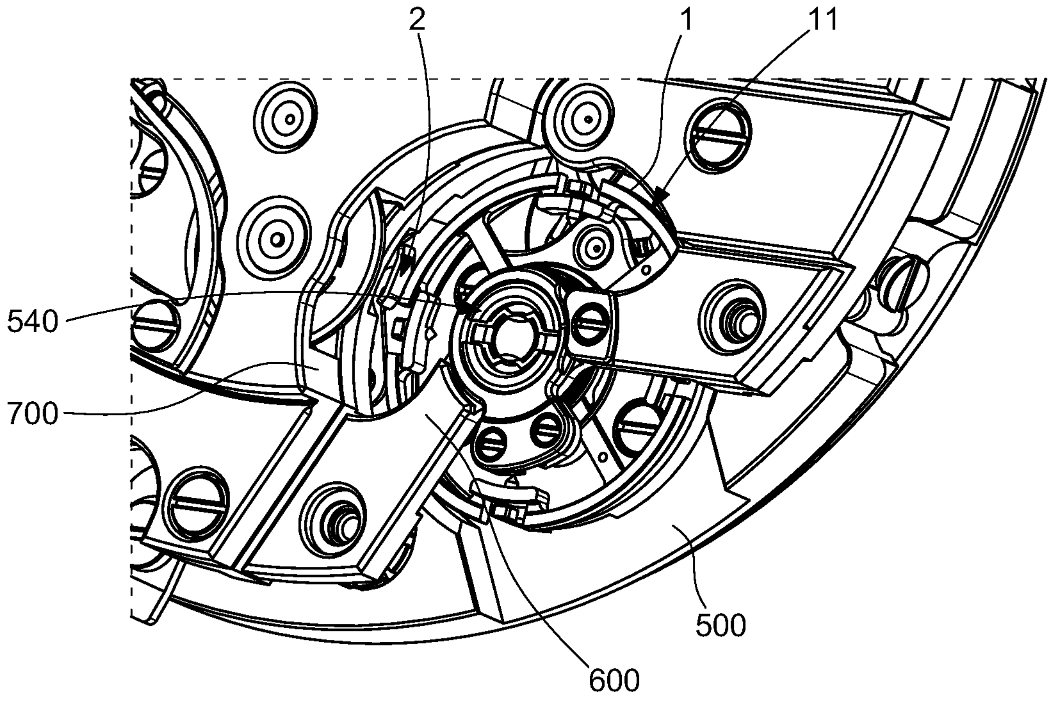
FIGS. 9 and 10 represent, schematically, in a partial perspective view, in similar configurations to FIGS. 2 and 3, a mechanism equipped with a stopping mechanism according to the invention in the conventional case of a low-frequency oscillator (less than or equal to 5 Hz) with a stop-second bearing on the balance felloe; the pallet assembly bridge can be dismantled without dismantling the stop-second.
Figure 10:
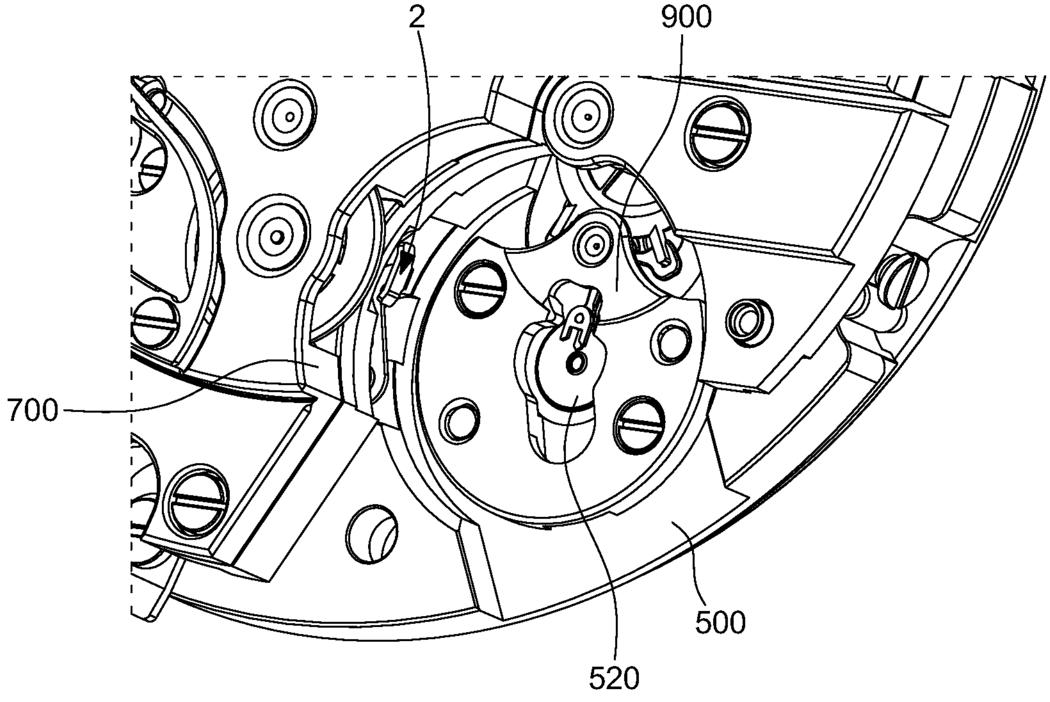
Figure 11:
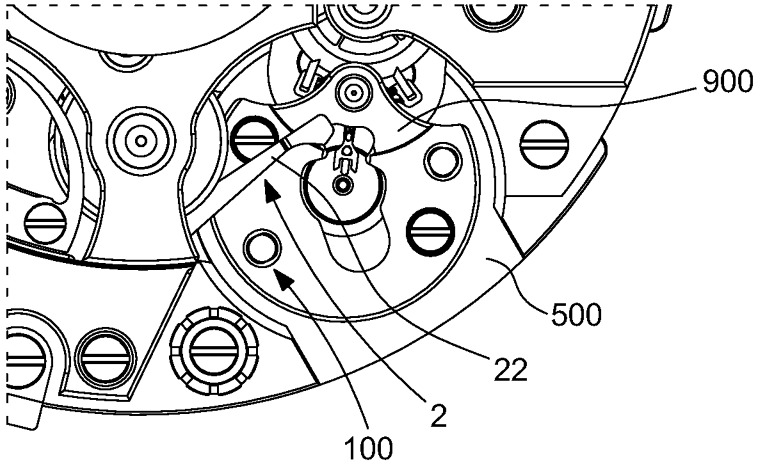
FIGS. 11 to 13 represent, schematically, in a partial planar view for FIG. 11 and perspective view for FIGS. 12 and 13, in similar configurations respectively to FIGS. 1 and 2 and 3, a mechanism equipped with a stopping mechanism according to the invention in the case of a caliber with a high-frequency oscillator (greater than 5 Hz, particularly approximately 10 Hz) with a stop-second acting upon a heart-piece (not seen in the figures) on the balance in order to restart it for the start; the stop-second passes above the pallet assembly bridge, and, thanks to the invention, it can be extracted from the chamber containing it, between the support plate and the stop-second bridge, by an axial movement enabling the extraction thereof from the pivot thereof, and a planar movement enabling both the uncoupling of the fork of the first arm with the trunnion of the control organ, and the substantially planar extraction of the stopping lever by the balance bed.
Figure 12:
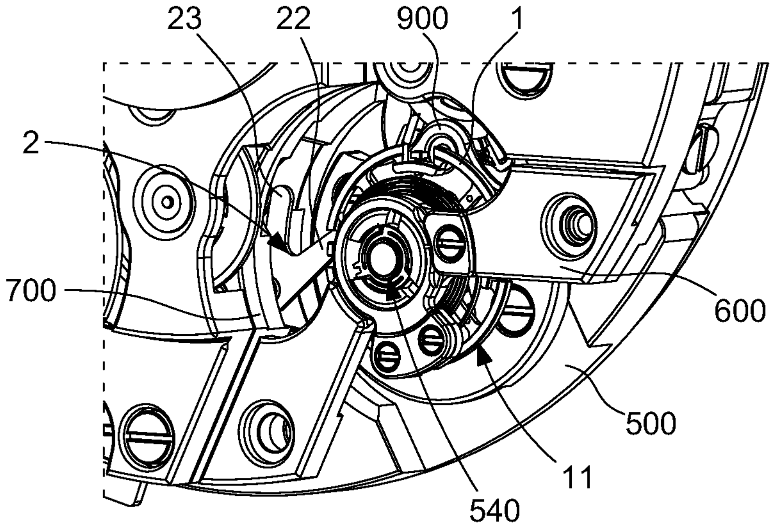
Figure 13:
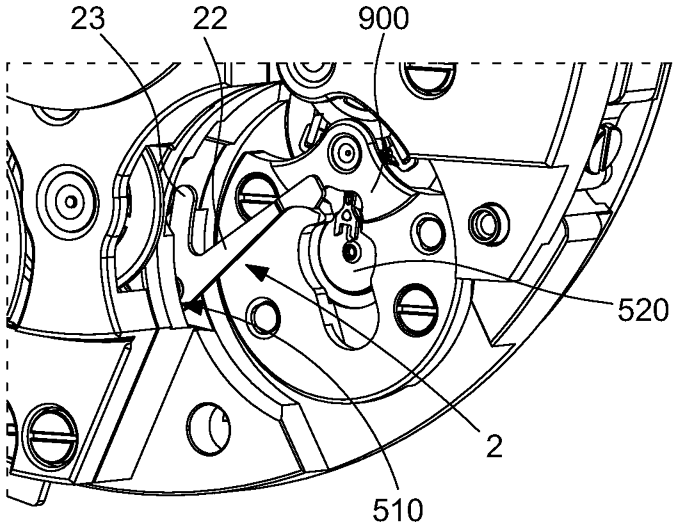

The invention relates to a stopping mechanism 100 for triggering the stopping or release of a regulating or chronograph mechanism wheel 1 of a timepiece 1000.

This stopping mechanism 100 includes a structure 500, particularly a plate or similar, and at least a first bridge 600 on either side of the wheel 1 which is rotatable about a main axis D.

The stopping mechanism 100 includes a control organ 210, which can be operated directly or indirectly by a user, and which is linked with a stopping lever 2, which includes at least one support surface 20 arranged to bear on a complementary front and/or edge support surface 11 of the wheel 1.

This stopping lever 2 is movable between a working position where any support surface 20 is at a distance from the complementary support surface 11 and where the wheel 1 rotates freely, and a stopping position where at least one support surface 20 is bearing on the complementary support surface 11 and where the wheel 1 is in a rotation stopping position.

According to the invention, the stopping lever 2 includes, rigidly connected to each other and rotatable together with respect to a pivot axis DP parallel with the main axis D, a first control part 21 and a second support part 22. The first control part 21 is linked removably with the control organ 210, at a link axis DA, preferably parallel with the pivot axis DP. This removable link allows a substantially planar extraction or insertion of the first part 21 with respect to the control organ 210, perpendicularly to the link axis DA. The second support part 22, which includes this at least one support surface 20, is movable between the structure 500 and the first bridge 600.

The stopping lever 2 is fitted, at the pivot axis DP, in an axially removable manner with respect to a rotation guidance element 510 included in the structure 500.

The stopping mechanism 100 further includes at least one elastic return means, which is arranged to exert an axial force on the stopping lever 2 and press it on the structure 500.

More specifically, the stopping lever 2 is inserted between the structure 500 and a second bridge 700, included in the stopping mechanism 100, which define together a chamber 800 wherein the stopping lever 2 is fitted, at the pivot axis DP, in an axially removable manner with respect to the rotation guidance element 510.

More specifically, the chamber 800 includes a pivoting trunnion 810 defining the pivot axis DP and arranged to cooperate with minimal radial play with a hole 820 included in the stopping lever 2, or vice versa. The pivoting of the addendum of the pivoting trunnion 810 is less than the difference between the height of the chamber 800 along the axial direction Z at the pivot axis DP, and the maximum thickness of the stopping lever 2, so as to allow the extraction of the stopping lever 2 by combining an axial movement to countersink the hole 820 of the pivoting trunnion 810, and a substantially planar movement, perpendicularly to the link axis DA, of the stopping lever 2.

More specifically, the stopping mechanism 100 further includes, rigidly connected to the first part 21 and second part 22, a third stabilisation part 23 which is movable in the chamber 800, with at least one axial degree of freedom along an axial direction Z parallel with the main axis D.

More specifically, the structure 500 and the second bridge 700 limit the axial travel of the third stabilisation part 23 below a maximum value CM, to ensure a rotation movement of the second part 22 about the pivot axis DP, substantially planar perpendicularly to the main axis D.

More specifically, the removable link between the first control part 21 and the control organ 210 includes a fork 25 borne by the first part 21, arranged to cooperate with a pin 26 included in the control organ 210, or vice versa, so as to allow a lateral fitting or dismantling between the first part 21 and the control organ 210.

More specifically, the elastic return means is borne by the stopping lever 2, which includes a fourth flexible part 24, arranged to cooperate in support with a bottom surface 724 of the second bridge 700 to press the stopping lever 2 on the structure 500. In a variant not illustrated, this elastic return means can consist of a spring rigidly connected to the second bridge 700, or similar. More specifically, the fourth part 24 is not coplanar with the first part 21, the second part 22 and the third part 23, which are coplanar with each other. In a specific variant, not illustrated by the figures, the fourth part 24 is one piece with the third part 23, and is not coplanar with the first part 21 and the second part 22 which are coplanar with each other. In a further variant, the fourth part 24 is one piece with the first part 21, and is not coplanar with the second part 22 and the third part 23, which are coplanar with each other.

More specifically, the stopping lever 2 is one-piece.

More specifically, the stopping lever 2 is a blanked and bent component, and therefore very economical.

The invention further relates to a timepiece 1000 including a regulating or chronograph mechanism including a structure 500 and at least a first bridge 600 on either side of a wheel 1 rotating about a main axis D, and including such a stopping mechanism 100, for triggering the stopping or release of this regulating or chronograph mechanism wheel 1.

More specifically, the mechanism bearing the wheel 1 is a regulating mechanism, wherein the wheel 1 is an inertia-block or a balance or a tourbillon cage, and which regulating mechanism includes, superposed along the axial direction Z, from the structure 500 bearing a lower pivot 520, a pallet assembly bridge 900, the inertia-block or the balance or the tourbillon cage, the stopping lever 2 which can be dismantled by leaving an axial access to said pallet assembly bridge 900 and allowing the removal of the inertia-block or the balance or the tourbillon cage, the second bridge 700, and the first bridge 600 bearing an upper pivot 540.

More specifically, the stopping lever 2 is arranged to cooperate with a heart-piece borne by the inertia-block or the balance or the tourbillon cage, in order to restart it for the start during the release thereof.

More specifically, the lower pivot 520 and/or the upper pivot 540 is a magnetic pivot. Indeed, the use of magnetic pivots is particularly advantageous for guiding a high-frequency oscillator, of the order of 10 Hz.

More specifically, the stopping lever 2 is arranged to cooperate in tangential support with a felloe or a peripheral surface included in the inertia-block or the balance or the tourbillon cage, and is, in planar projection along the axial direction Z, in each of the positions thereof, external to the pallet assembly bridge 900.

The invention thus provides an economical solution for the stated problem: the stopping lever, also more commonly referred to as stop lever, is designed so that it can be dismantled without removing the bridge above it. The sectional figures make it possible to understand the system.

The movement to be applied to dismantle the stopping lever is broken down into two phases: an axial movement along the direction Z to free the stopping lever from the guidance at the pivot axis DP, and then a planar movement in a plane parallel with that of the balance. Indeed, the shaft guiding the stopping lever enables axial fitting/dismantling along the axis Z, parallel with the axis of rotation of the balance.

The link with the control mechanism upstream is performed with a linked mechanism, such as a fork and a pin enabling lateral dismantling, or similar.

To hold the stopping lever in place and prevent it from being dismantled on its own, it advantageously includes a flexible strip bearing on the upper bridge, which presses it axially downwards on the structure, particularly a plate.

While, on a caliber with a low-frequency oscillator (less than or equal to 5 Hz) with stop-second bearing on the balance fellow, the pallet assembly bridge can be dismantled without dismantling the stop-second, the same does not apply on a caliber including a high-frequency oscillator (over Hz), which requires a stop-second which acts upon a heart-piece on the balance in order to restart it for the start; the stop-second then passes above the pallet assembly bridge, and the invention finds all its usefulness therein. Indeed, a calibre with a high-frequency oscillator requires such a stop-second which acts upon a heart-piece on the balance in order to restart it for the start, this start function being necessary due to a frequency greater than 5 Hz. The stop-second therefore passes above the pallet assembly point. In the case of setting of the pallets of the pallet assembly, it is necessary to be able to dismantle the pallet assembly bridge and therefore dismantle the stop-second. The invention makes it possible to dismantle the upper bridge (barrel bridge, geartrain bridge, or other), and renders maintenance operations more economical, and ensures the cleanliness of the mechanisms.

The invention claimed is:

1. A stopping mechanism (100) for triggering the stopping or release of a regulating or chronograph mechanism wheel (1) of a timepiece (1000), including a structure (500) and at least a first bridge (600) on either side of said wheel (1) which is rotatable about a main axis (D), said stopping mechanism (100) including a control organ (210) which can be operated directly or indirectly by a user and linked with a stopping lever (2) which includes at least one support surface (20) arranged to bear on a complementary front and/or edge support surface (11) of said wheel (1), said stopping lever (2) being rotatable about a pivot axis (DP) parallel with said main axis (D) between a working position where any said support surface (20) is at a distance from said complementary support surface (11) and where said wheel (1) is free to rotate, and a stopping position where at least one said support surface (20) is bearing on said complementary support surface (11) and where said wheel (1) is in a rotation stopping position, wherein said stopping lever (2) includes, integrally connected to each other and rotatable together with respect to the pivot axis (DP), a first control part (21) which is linked in a removable manner with said control organ (210), at a link axis (DA) parallel with said pivot axis (DP), said removable link allowing a substantially planar extraction or insertion of said first part (21) with respect to said control organ (210), perpendicularly to said link axis (DA), and a second support part (22) including said at least one support surface (20) and which is movable between said structure (500) and said first bridge (600), wherein said stopping lever (2) includes a hole (820) defined between said first control part (21) and said second support part (22), said hole (820) arranged to cooperate with a pivoting trunnion (810) defining said pivot axis (DP), and wherein said stopping lever (2) is fitted, at the pivot axis (DP), in an axially removable manner with respect to a rotation guidance element (510) included in the structure (500) by an axial movement to free said hole (820) of said pivoting trunnion (810).

2. The stopping mechanism (100) according to claim 1, wherein said removable link between said first control part (21) and said control organ (210) includes a fork (25) borne by said first part (21), arranged to cooperate with a pin (26) included in said control organ (210), or vice versa, so as to allow a lateral fitting or dismantling between said first part (21) and said control organ (210).

3. The stopping mechanism (100) according to claim 1, wherein said stopping lever (2) is one-piece.

4. A timepiece (1000) including a regulating or chronograph mechanism including a structure (500) and at least a first bridge (600) on either side of a wheel (1) rotating about a main axis (D), and including a stopping mechanism (100) according to claim 1, for triggering the stopping or release of said regulating or chronograph mechanism wheel (1).

5. The timepiece (1000) according to claim 4, wherein said mechanism bearing said wheel (1) is a regulating mechanism, wherein said wheel (1) is an inertia-block or a balance or a tourbillon cage, and which regulating mechanism includes, superposed along said axial direction (Z), from said structure (500) bearing a lower pivot (520), a pallet assembly bridge (900), said inertia-block or said balance or said tourbillon cage, said stopping lever (2) which can be dismantled by leaving an axial access to said pallet assembly bridge (900) and allowing the removal of said inertia-block or said balance or said tourbillon cage, said second bridge (700), and said first bridge (600) bearing an upper pivot (540).

6. The timepiece (1000) according to claim 5, wherein said stopping lever (2) is arranged to cooperate with a heart-piece borne by said inertia-block or said balance or said tourbillon cage, in order to restart it for the start during the release thereof.

7. The timepiece (1000) according to claim 5, wherein said lower pivot (520) and/or said upper pivot (540) is a magnetic pivot.

8. The timepiece (1000) according to claim 5, wherein said stopping lever (2) is arranged to cooperate in tangential support with a felloe or a peripheral surface included in said inertia-block or said balance or said tourbillon cage, and is, in planar projection along said axial direction (Z), in each of the positions thereof, external to said pallet assembly bridge (900).

9. A stopping mechanism (100) for triggering the stopping or release of a regulating or chronograph mechanism wheel (1) of a timepiece (1000), including a structure (500) and at least a first bridge (600) on either side of said wheel (1) which is rotatable about a main axis (D), said stopping mechanism (100) including a control organ (210) which can be operated directly or indirectly by a user and linked with a stopping lever (2) which includes at least one support surface (20) arranged to bear on a complementary front and/or edge support surface (11) of said wheel (1), said stopping lever (2) being movable between a working position where any said support surface (20) is at a distance from said complementary support surface (11) and where said wheel (1) is free to rotate, and a stopping position where at least one said support surface (20) is bearing on said complementary support surface (11) and where said wheel (1) is in a rotation stopping position, wherein said stopping lever (2) includes, rigidly connected to each other and rotatable together with respect to a pivot axis (DP) parallel with said main axis (D), a first control part (21) which is linked in a removable manner with said control organ (210), at a link axis (DA) parallel with said pivot axis (DP), said removable link allowing a substantially planar extraction or insertion of said first part (21) with respect to said control organ (210), perpendicularly to said link axis (DA), and a second support part (22) including said at least one support surface (20) and which is movable between said structure (500) and said first bridge (600), and wherein said stopping mechanism (100) further includes at least one elastic return means arranged to exert an axial force on said stopping lever (2) and press it on said structure (500).

10. The stopping mechanism (100) according to claim 9, wherein said elastic return means is borne by said stopping lever (2) which includes a fourth flexible part (24), arranged to cooperate in support with a bottom surface (724) of said second bridge (700) to press said stopping lever (2) on said structure (500).

11. The stopping mechanism (100) according to claim 10, wherein said fourth part (24) is not coplanar with said first part (21), said second part (22) and said third part (23), which are coplanar with each other.

12. The stopping mechanism (100) according to claim 10, wherein said fourth part (24) is one piece with said third part (23), and is not coplanar with said first part (21) and said second part (22) which are coplanar with each other.

13. The stopping mechanism (100) according to claim 10, wherein said fourth part (24) is one piece with said first part (21), and is not coplanar with said second part (22) and said third part (23) which are coplanar with each other.

14. A stopping mechanism (100) for triggering the stopping or release of a regulating or chronograph mechanism wheel (1) of a timepiece (1000), including a structure (500) and at least a first bridge (600) on either side of said wheel (1) which is rotatable about a main axis (D), said stopping mechanism (100) including a control organ (210) which can be operated directly or indirectly by a user and linked with a stopping lever (2) which includes at least one support surface (20) arranged to bear on a complementary front and/or edge support surface (11) of said wheel (1), said stopping lever (2) being movable between a working position where any said support surface (20) is at a distance from said complementary support surface (11) and where said wheel (1) is free to rotate, and a stopping position where at least one said support surface (20) is bearing on said complementary support surface (11) and where said wheel (1) is in a rotation stopping position, wherein said stopping lever (2) includes, rigidly connected to each other and rotatable together with respect to a pivot axis (DP) parallel with said main axis (D), a first control part (21) which is linked in a removable manner with said control organ (210), at a link axis (DA) parallel with said pivot axis (DP), said removable link allowing a substantially planar extraction or insertion of said first part (21) with respect to said control organ (210), perpendicularly to said link axis (DA), and a second support part (22) including said at least one support surface (20) and which is movable between said structure (500) and said first bridge (600), and wherein said stopping lever (2) is inserted between said structure (500) and a second bridge (700), included in said stopping mechanism (100), which define together a chamber (800) wherein said stopping lever (2) is fitted, at the pivot axis (DP), in an axially removable manner with respect to said rotation guidance element (510).

15. The stopping mechanism (100) according to claim 14, wherein said chamber (800) includes, as said rotation guidance element (510), a pivoting trunnion (810) defining said pivot axis (DP) and arranged to cooperate with minimal radial play with a hole (820) included in said stopping lever (2), or vice versa, a height of an addendum of said pivoting trunnion (810) being less than the difference between the height of said chamber (800) along said axial direction (Z) at said pivot axis (DP), and the maximum thickness of said stopping lever (2), so as to allow the extraction of said stopping lever (2) by combining an axial movement to free said hole (820) of said pivoting trunnion (810), and a substantially planar movement, perpendicularly to said link axis (DA), of said stopping lever (2).

16. The stopping mechanism (100) according to claim 14, wherein said stopping mechanism (100) further includes, rigidly connected to said first part (21) and second part (22), a third stabilisation part (23) which is movable in said chamber (800), with at least one axial degree of freedom along an axial direction (Z) parallel with said main axis (D).

17. The stopping mechanism (100) according to claim 16, wherein said structure (500) and said second bridge (700) limit an axial travel of said third stabilisation part (23) below a maximum value (CM) to ensure a rotation movement of said second part (22) about said pivot axis (DP), substantially planar perpendicularly to said main axis (D).

* * * * *